US012645986B2

(12) United States Patent
Lee-Thorp et al.

(10) Patent No.: US 12,645,986 B2
(45) Date of Patent: Jun. 2, 2026

(54) MIXING TOKENS WITH SPECTRAL TRANSFORM

(71) Applicant: Google LLC, Mountain View, CA (US)

(72) Inventors: James Patrick Lee-Thorp, San Francisco, CA (US); Joshua Timothy Ainslie, Saratoga, CA (US); Ilya Eckstein, Mountain View, CA (US); Santiago Ontañón, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1270 days.

(21) Appl. No.: 17/474,928

(22) Filed: Sep. 14, 2021

(65) Prior Publication Data

US 2023/0077928 A1     Mar. 16, 2023

(51) Int. Cl.
*G06N 20/00* (2019.01)
*G06F 17/14* (2006.01)
(52) U.S. Cl.
CPC ........... *G06N 20/00* (2019.01); *G06F 17/141* (2013.01)
(58) Field of Classification Search
CPC .... G06F 17/141; G06N 20/00; G06N 3/0455; G06N 3/08
See application file for complete search history.

(56) References Cited

U.S. PATENT DOCUMENTS

2022/0198254 A1* 6/2022 Dalli ...................... G06N 3/084

OTHER PUBLICATIONS

Lou et al., "FNetAR: Mixing Tokens with Autoregressive Fourier Transforms", Jul. 22, 2021, arXiv:2107.10932v1, pp. 1-9. (Year: 2021).*
Vaswani et al., "Attention Is All You Need", Dec. 6, 2017, arXiv: 1706.03762v5, pp. 1-15. (Year: 2017).*
Ainslie et al, "ETC: Encoding long and structured inputs in transformers" EMNLP, 2020, 17 pages.
Backurs et al, "A note on more efficient architectures for NLP" MIT, 2021, 6 pages.
Bahdanau et al, "Neural machine translation by jointly learning to align and translate" arXiv, 2014, 15 pages.
Barron, "Universal approximation bounds for superpositions of a sigmoidal function" IEEE, 1993, 16 pages.
Beltagy et al, "Longformer: The long-document transformer" arXiv, 2020, 17 pages.
Brown et al, "Language models are few-shot learners" arXiv, 2020, 75 pages.

(Continued)

*Primary Examiner* — Brent Johnston Hoover
(74) *Attorney, Agent, or Firm* — Fish & Richardson P.C.

(57) ABSTRACT

Transformer systems and methods of using such transformer systems including computer programs encoded on a computer storage medium, for performing a deep learning task on an input sequence to generate an encoded output. In one aspect, one of the transformer systems includes an encoder architecture block, comprising: a spectral transform mixing layer that receives input embeddings of input tokens and generates, as output, a spectral transform output along a sequence dimension of the input embeddings; and a feed forward layer that receives an input based on the input embeddings of input tokens and the spectral transform output and generates an output for a subsequent processing block.

19 Claims, 3 Drawing Sheets

(56)     References Cited

OTHER PUBLICATIONS

Cheng et al, "An exploration of parameter redundancy in deep networks with circulant projections" arXiv, 2015, 9 pages.
Child et al, "Generating long sequences with sparse transformers" arXiv, 2019, 10 pages.
Chitsaz et al, "Acceleration of convolutional neural network using fft-based split convolutions" arXiv, 2020, 5 pages.
Choromanski et al, "Masked language modeling for proteins via linearly scalable long-context transformers" arXiv, 2020, 21 pages.
Choromanski et al, "Rethinking attention with performers" arXiv, 2020, 36 pages.
Clark et al, "What does BERT look at? an analysis of BERT's attention" Proceedings of the Second BlackboxNLP Workshop on Analyzing and Interpreting Neural Networks for NLP, 2019, 11 pages.
Cooley et al, "An algorithm for the machine calculation of complex fourier series" Mathematics of computation, 1965, 5 pages.
Cybenko, "Approximation by superpositions of a sigmoidal function" Mathematics of control, signals and system, 1989, 13 pages.
Delvin et al, "Bert: Pre-training of deep bidirectional transformers for language understanding" arXiv, 2018, 14 pages.
Dosovitskiy et al, "An image is worth 16x16 words: Transformers for image recognition at scale" arXiv, 2020, 21 pages.
El-Bakry et al, "Fast object/face detection using neural networks and fast fourier transform" International Journal of Signal Processing, 2007, 6 pages.
Frigo et al, "The design and implementation of fftw3" IEEE, 2005, 16 pages.
Gothwal et al, "Cardiac arrhythmias detection in an ecg beat signal using fast fourier transform and artificial neural network" Journal of Biomedical Science and Engineering, 2011, 8 pages.
Hewitt et al, "Designing and interpreting probes with control tasks" EMNLP-IJCNLP, 2019, 11 pages.
Highlander et al, "Very efficient training of convolutional neural networks using fast fourier transform and overlap-and-add" arXiv, 2016, 9 pages.
Ivanov et al, "Data movement is all you need: A case study of transformer networks" arXiv, 2020, 15 pages.
Jiao et al, "Tinybert: Distilling bert for natural language understanding" arXiv, 2019, 14 pages.
Katharopoulos et al, "Transformers are rnns: Fast autoregressive transformers with linear attention" ICML, 2020, 17 pages.
Kim et al, "Fastformers: Highly efficient transformer models for natural language understanding" arXiv, 2020, 10 pages.
Kitaev et al, "Reformer: The efficient transformer" arXiv, 2020, 12 pages.
Koplon et al, "Using fourier-neural recurrent networks to fit sequential input/output data" Neurocomputing, 1997, 24 pages.
Kudo et al, "Sentencepiece: A simple and language independent subword tokenizer and detokenizer for neural text processing" arXiv, 2018, 6 pages.
Kunz, "On the equivalence between one-dimensional discrete walsh-hadamard and multidimensional discrete fourier transforms" IEEE, 1979, pages.
Lepikhin et al, "Gshard: Scaling giant models with conditional computation and automatic sharding" arXiv, 2020, 35 pages.
Li et al, "Fourier neural operator for parametric partial differential equations" arXiv, 2020, 16 pages.
Lin et al, "Fft-based deep learning deployment in embedded systems" IEEE, 2018, 6 pages.
Liu et al, "Generating wikipedia by summarizing long sequences" arXiv, 2018, 18 pages.
Mathieu et al, "Fast training of convolutional networks through ffts" arXiv, 2014, 9 pages.
Minami et al, "Real-time discrimination of ventricular tachyarrhythmia with fourier-transform neural network" IEEE, 1999, 7 pages.

Mironovova et al, "Fast fourier transform for feature extraction and neural network for classification of electrocardiogram signals" IEEE, 2015, 6 pages.
Moczulski et al, "ACDC: A structured efficient linear layer" arXiv, 2015, 11 pages.
Narang et al, "Do transformer modifications transfer across implementations and applications?" arXiv, 2021, 16 pages.
Parmar et al, "Image transformer" arXiv, 2018, 10 pages.
Peng et al, "Random feature attention" arXiv, 2021, 19 pages.
Pratt et al, "FCNN: Fourier convolutional neural networks" Springer, 2017, 13 pages.
Qiu et al, "Blockwise self-attention for long document understanding" arXiv, 2019, 12 pages.
Raffel et al, "Exploring the limits of transfer learning with a unified text-to-text transformer" arXiv, 2019, 53 pages.
Raganato et al, "Fixed encoder self-attention patterns in transformer-based machine translation" arXiv, 2020, 13 pages.
Rahimi et al, "Random features for large-scale kernel machines" NIPS, 2008, 8 pages.
Ramsauer et al, "Hopfield networks is all you need" arXiv, 2020, 95 pages.
Roy et al, "Efficient content-based sparse attention with routing transformers" Transactions of the Association for Computational Linguistics, 2021, 16 pages.
Sanh et al, "Distilbert, a distilled version of bert: smaller, faster, cheaper and lighter" arXiv, 2019, 5 pages.
Shazeer, "Fast transformer decoding: One write-head is all you need" arXiv, 2019, 9 pages.
Shlifer et al, "Pre-trained summarization distillation" arXiv, 2020, 10 pages.
Sindhwani et al, "Structured transforms for small-footprint deep learning" NIPS, 2015, 9 pages.
Tamkin et al, "Language through a prism: A spectral approach for multiscale language representations" NIPS, 2020, 13 pages.
Tay et al, "Synthesizer: Rethinking self-attention in transformer models" arXiv, 2020, 13 pages.
Tay et al, "Sparse sinkhorn attention" ICML, 2020, 10 pages.
Tay et al, "Long range arena: A benchmark for efficient transformers" arXiv, 2020, 16 pages.
Tay et al, "Efficient transformers: A survey" arXiv, 2020, 28 pages.
Tenney et al, "BERT rediscovers the classical NLP pipeline" Proceedings of the 57th Annual Meeting of the Association for Computational Linguistics, 2019, 9 pages.
Tolsteikhin et al, "MLP-mixer: An all-mlp architecture for vision" arXiv, 2021, 16 pages.
Turc et al, "Well-read students learn better: On the importance of pre-training compact models" arXiv, 2019, 13 pages.
Vaswani et al, "Attention is all you need" arXiv, 2017, 15 pages.
Vig et al, "Analyzing the structure of attention in a transformer language model" Proceedings of the 2019 ACL Workshop BlackboxNLP: Analyzing and Interpreting Neural Networks for NLP, 2019, 14 pages.
Voita et al, "Analyzing multi-head self-attention: Specialized heads do the heavy lifting, the rest can be pruned" Proceedings of the 57th Annual Meeting of the Association for Computational Linguistics, 2019, 12 pages.
Vyas et al, "Fast transformers with clustered attention" NIPS, 2020, 10 pages.
Wang et al, "Glue: A multi-task benchmark and analysis platform for natural language understanding" arXiv, 2018, 13 pages.
Wang et al, "Linformer: Self-attention with linear complexity" arXiv, 2020, 12 pages.
You et al, "Hard-coded gaussian attention for neural machine translation" arXiv, 2020, 12 pages.
Zaheer et al, "Big bird: Transformers for longer sequences" arXiv, 2020, 51 pages.
Zhang et al, "Learning long term dependencies via fourier recurrent units" ICML, 2018, 9 pages.
Zhang et al, "Forenet: fourier recurrent networks for time series prediction" ICONIP, 2000, 6 pages.

(56)     References Cited

OTHER PUBLICATIONS

Zhang et al, "Fault diagnosis and prognosis using wavelet packet decomposition, fourier transform and artificial neural network" Journal of Intelligent Manufacturing, 2013, 15 pages.

* cited by examiner

300

310

Receive input embeddings of input tokens

320

Spectrally transform the input embeddings into a spectral transform output along a sequence dimension of the input embeddings

330

Feed-forward process of the input embeddings of the input tokens and the spectral transform output to generate an output for a subsequent processing block

MIXING TOKENS WITH SPECTRAL TRANSFORM

BACKGROUND

This specification relates to transformer encoder architectures.

Transformer model architecture or transformers are deep learning models that adopt an attention mechanism to weight significance of various parts of the input data differently. Transformers can be useful in making inferences in natural language processing and computer vision tasks. A transformer can include encoder and decoder blocks. An encoder block can generate encoding information of the input data and can be repeated for multiple times using as input an output from its preceding block. An encoder block can use an attention mechanism to achieve its encoding functions. The transformer encoder block can also include a feed forward neural network, an adding and normalization layer, residual connections, or their combinations.

SUMMARY

This specification describes a transformer system implemented as computer programs on one or more computers in one or more locations that can perform a deep learning task on an input.

In general, one innovative aspect of the subject matter described in this specification can be embodied in methods that include the actions of an encoder architecture block, comprising: a spectral transform mixing layer that receives input embeddings of input tokens and generates, as output, a spectral transform output along a sequence dimension of the input embeddings; and a feed forward layer that receives an input based on the input embeddings of input tokens and the spectral transform output and generates an output for a subsequent processing block. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The transformer systems described in this specification can allow a neural network system to process input sequences, generate encoded outputs, or both with improved performance than existing transformers and transformer variants. The transformer systems and methods of using such transformer systems achieve the improved performance by replacing some or all the attention mechanisms in existing transformers and variants with a spectral transform, e.g., a discrete Fourier transform. When compared with existing transformer and variants, the transformer systems and methods disclosed herein can achieve comparable accuracy with a significantly increased speed both in training and inference (e.g., two times faster on tensor processing units (TPUs) and seven times faster on graphics processing units (GPUs) across different input sequence lengths). In addition, the transformer systems and methods disclosed herein advantageously leave a lighter memory footprint than traditional transformers and variants across different input sequence lengths.

In the context of natural language processing, the attention layers in existing transformers and variants may provide capture of diverse syntactic and semantic relationships in an input sequence with a trade-off of significant increase in cost, time, and model complexity. For example, the attention layers can generate a large amount of trainable parameters (e.g., $2\times10^6$ to $3\times10^6$ parameters) thus imposing a high demand on time and memory for training, especially when the input data includes long sequences (e.g., greater than 512 tokens).

The described transformer systems and methods, however, address these problems by replacing some or all the attention layers in existing transformer and variants to: (i) eliminate the need to train a large amount of parameters; (ii) achieve comparable mixing results of the input tokens that can similarly facilitate training of the transformer systems and modeling of the input sequence for various tasks in the context of natural language processing and/or computer vision.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in various drawings indicate like elements.

DETAILED DESCRIPTION

Figure 1:
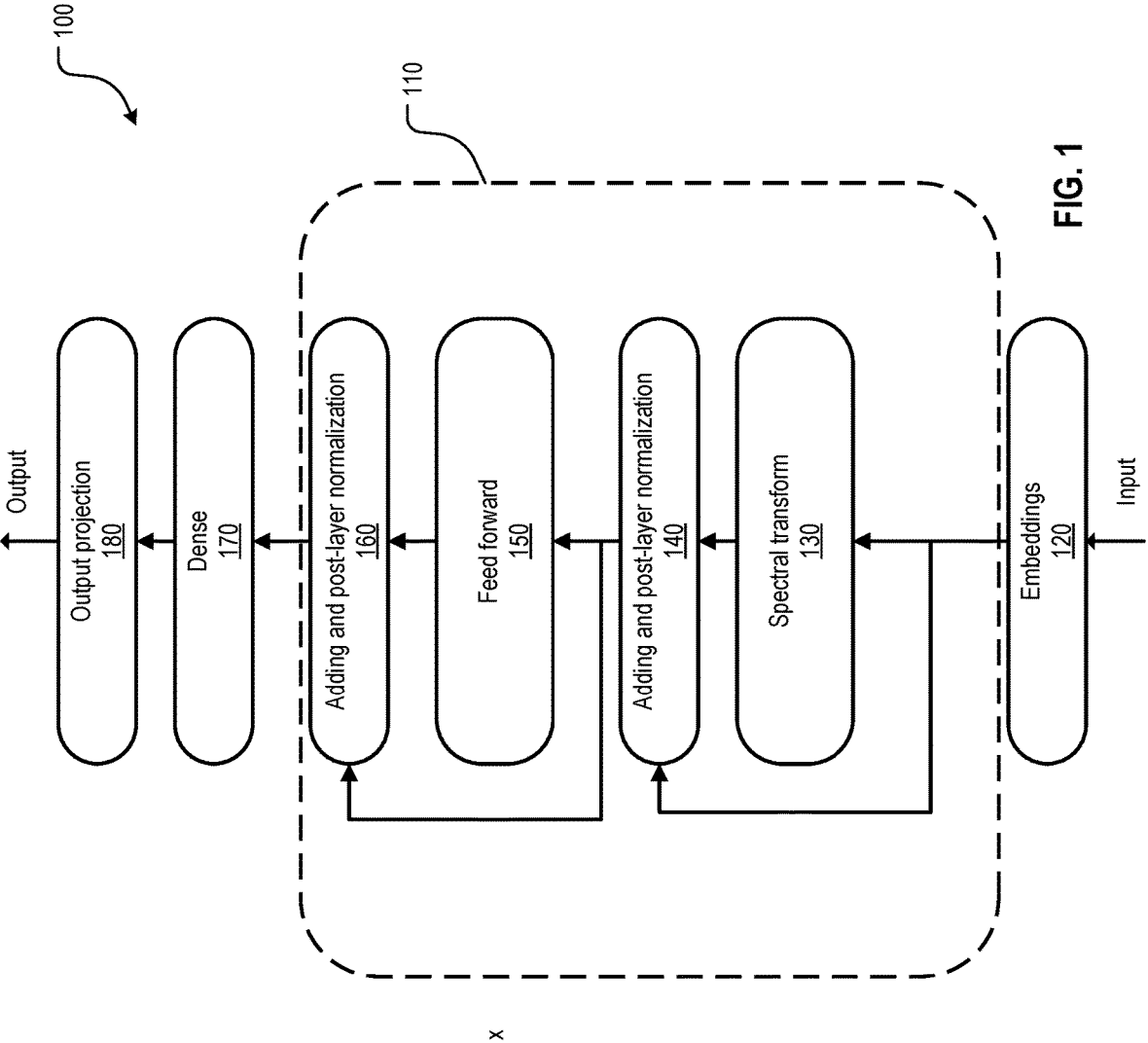
FIG. 1 is an illustration of an example transformer system.

This specification describes a transformer system implemented as computer programs on one or more computers in one or more locations that performs a deep learning task on an input.

The deep learning task can be any machine learning task that operates on an input related to natural language processing or computer vision tasks, generates an output that includes encoded representation of the input, or both.

Some examples of deep learning tasks that the system can be configured to perform are described in the following paragraphs.

As one example, the deep learning task may be machine translation, where the input to the transformer system is a sequence of text in one language and the output generated by the transformer system may be an encoded representation of the input sequence of text, e.g., vector(s) that can be used by a transformer decoder to generate an output sequence. The output sequence may be in another language. The output sequence may be a score, a word, a phrase or any other output that includes an estimated likelihood or an inference related to the input sequence.

As another example, the task can be a natural language processing or understanding task, e.g., an entailment task, a paraphrase task, a textual similarity task, a textual classification task, a sentiment task, a sentence completion task, a grammaticality task, a reading comprehension task, a machine translation task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is a sequence derived from electronic health record data for a patient.

As another example, the task can be a text generation task.

To perform the deep learning task, the system includes an encoder block that can be iterated for multiple times until a desired output is generated or a predetermined threshold is met. The first iteration can use input tokens or input embeddings derived from input tokens as its input. The subsequent iterations of the transformer encoder block can use the output of a preceding block as its input. The system disclosed herein can use a spectral transform mixing layer that replaces the attention mechanism in existing transformers and its variants. Alternatively, the system can use the spectral transform mixing layers in combination with the attention mechanism. For example, the system disclosed herein can include a first number of iterations of the transformer encoder block using spectral transform and a second number of iteration of a processing block including the attention mechanism. in some implementations, the second number of iterations of the processing block including the attention mechanism can be subsequent to at least part of the first number iterations using spectral transforms. The first number can be equal to the second number. Alternatively, the first number can be greater or less than the second number.

Each encoder block can include multiple layers. One or more of the multiple layers are spectral transform mixing layers that operate on a respective input to mix the input tokens, provide a subsequent layer access to some or all tokens, and allow the subsequent layer to generate its output based on some or all the tokens in every iteration. As such, the transformer system can be more efficient and accurate in both training and inference compared with transformers without a spectral transform mixing layer. In the context of natural language processing, the spectral transform mixing layer may provide a spectral transform output that allows its subsequent layer to generate the output based on some or all tokens thereby improving training of the transformer system and modeling of the input sequence in the context of natural language processing, computer vision, or other applications that utilize a transformer system as described in this specification.

The spectral transform may be a linear transform. Each spectral transform mixing layer can transform its respective input using either a one-dimensional spectral transform along the sequence dimension or a two-dimensional spectral transform along the sequence dimension and a hidden dimension. The spectral transform mixing layer need not include any parameter that needs to be trained. The size of the spectral transform, along the sequence dimension or the hidden dimension, can be determined based on the input data. In particular, the size of the spectral transform, along the sequence dimension, can depend on the length of the input sequence, the number of input tokens, the number of input embeddings, or a combination thereof. The size of the spectral transform along the hidden dimension can be (but does not need to be) different from the size of the spectral transform along the sequence dimension. In particular, the size of the spectral transform along the hidden dimension can depend on the size of one or more vectors representing the input embeddings or the input tokens. In some embodiments, the iteration number of the spectral transform mixing layer is an even number. When the iteration number is larger than a preset threshold, it can be an even or odd.

In some implementations, the spectral transform can be a Fourier transform. More specifically, the spectral transform can be a discrete Fourier transform (DFT). The DFT can be performed by using either fast Fourier transform (FFT) or matrix multiplication. For example, on TPUs, the multiplication matrix can be pre-calculated, and computing the DFT through matrix multiplication is faster for shorter input sequences (e.g., less than 8192 tokens) than computing through FFT. As another example, FFT is faster, on GPUs, than matrix multiplication for all sequence lengths, e.g., 512-8192 tokens.

One or more layers of the encoder block are feed forward layers. Each feed-forward layer can follow a spectral transform mixing layer, either immediately or after other layer(s) in between. The feed forward may handle real numbers as its input and perform a non-linear transform on its input.

When the feed forward layer does not immediately follow the spectral transform mixing layer, the encoder block can include an additive layer that adds input data without a spectral transform and the spectrally transformed data together to be an input for the feed forward layer. Similarly, another additive layer can add input for the feed forward layer and output from the feed forward layer together to be an input for a subsequent encoder block, e.g., a subsequent spectral transform layer. The addition of input without the spectral transform and the spectrally transformed input data may facilitate mixing of the input tokens, thereby improving training of the transformer system.

Each encoder block may include one or more normalization layers. A normalization layer can be positioned before or after a spectral transform mixing layer. A normalization layer can also be used before or after a feed forward layer.

These features and additional features are described in more detail below.

FIG. 1 is an illustration of an example transformer system 100. The transformer system 100 is an example of a system implemented as computer programs on one or more computers in one or more locations, in which the systems, layers, and methods described below can be implemented.

The transformer system 100 can receive an input and perform a deep learning task on the input to generate an output.

As described above, the transformer system 100 can perform any of a variety of tasks that involves operating on an input, e.g., an input sequence of text, generating an output representation of the input, or both. The transform system 100 can be a transformer encoder architecture.

The transformer system 100 can include an embeddings layer 120 that transforms an input, e.g., an input sequence of text, or input tokens of the input sequence, to input embeddings. The embeddings layer can generate the input embeddings as its output, which can be used as an input for an encoder architecture block 110.

The embeddings layer 120 can utilize text modeling and learning techniques on the input tokens or input sequence to generate input embeddings. The input embeddings can include representation of the input sequence of text at selected level(s) of abstraction. The embeddings can represent input tokens by mapping them to real-numbered vectors. The input sequence here may refer to an original sequence of text which can include one or more words or sentences. The input sequence herein may also refer to a token sequence. Each input token can be a unit of the input text. Tokens can be either bytes, words, characters, subwords, or segments of a sentence.

The embeddings layer 120 can generate different types of embeddings. In some embodiments, such different types of embeddings can include word embeddings, absolute position embeddings of the input tokens, the type embeddings of the sentences, or their combinations. The output of the embeddings layer can be multiple embedding vectors or an embedding matrix combining multiple embedding vectors.

Word embedding processing can be performed on one or more words in the input sequence or on input tokens to generate word embedding vectors. Position embedding processing can generate position vectors based on position of the words or input tokens. In some embodiments, the position can be an absolute position of a word or token in the input sequence. In some embodiments, the position can be a relative position with respect to a reference word or token.

The type embeddings can be used for differentiating input segments. An input segment can include multiple input tokens or words. The input segment can include a segment of a sentence, a full sentence, or a couple of sentences. Type embeddings can be used to distinguish sentences in next sentence prediction, sentence pairs for paraphrasing, hypothesis-premise pairs for entailment, and question-passage pairs for question answering. A "sentence" herein can be an arbitrary span of contiguous text or an actual linguistic sentence.

In some embodiments, the embedding vectors are in a vector space, e.g., the Euclidean space. When the word embedding vector(s), the position embedding vector(s), and the type embedding vector(s) are obtained, they can be combined into feature vector(s). As such, multiple feature vectors corresponding to the input sequence or input tokens can be generated. The feature vectors can be represented as an embedding matrix.

The output of the embeddings layer, e.g., input embeddings, can be provided as input to an encoder block 110, either directly or indirectly after some pre-processing of the input embeddings, such as pre-layer normalization.

Each encoder block 110 can include multiple layers. The encoder block 100 can include a spectral transform mixing layer 130. The spectral transform mixing layer 130 can be configured to mix the input embeddings of input tokens and output the mixed tokens as an input to a subsequent layer. The spectral transform can be along a sequence dimension, a hidden dimension, or both.

The sequence dimension can be a dimension of vector space in which the input text is represented by the input tokens of the input sequence. There can be one or more hidden dimensions. Each hidden dimension can be a dimension of vector space in which the input text is represented or embedded with different level(s) of abstraction. For example, the input data may be represented by input embeddings of input tokens in a hidden dimension.

By applying a spectral transform to the input embeddings, the spectral transform mixing layer 130 can generate the spectral transform output, which includes mixed input embeddings. The mixed input embeddings can comprise representations of the input embeddings, the input tokens, or both, with respect to a set of basis functions. The spectral transform can be defined by parameters representing the set of basis functions. The set of basis functions can be predetermined and remain constant during training of the transformer system 100. In some embodiments, applying the spectral transform involves representing the input embeddings with the set of basis functions in an alternative domain, e.g., a frequency domain. In some embodiments, iteratively applying the spectral transform multiple times includes alternating representations of the input embeddings with the set of basis functions back and forth in "time" and frequency domains. The set of basis functions can include sine and cosine waves.

In some implementations, the spectral transform mixing layer 130 can be a Fourier transform layer. The Fourier transform layer 130 can transform its respective input using either one-dimensional Fourier transform along the sequence dimension or two-dimensional Fourier transform along the sequence dimension and the hidden dimension.

The Fourier transform can be DFT which can include calculating FFT or a matrix multiplication of the input embeddings. For example, on TPUs, the multiplication matrix can be pre-calculated, and computing the DFT through matrix multiplication is faster for shorter input sequences (e.g., less than 512 tokens) than computing the DFT using FFT. As another example, on GPUs, using FFT is faster than matrix multiplication for all sequence lengths, e.g., 512-8192 tokens.

Given an input sequence $\{x_n\}$ with $n\in[0, N-1]$, the DFT along the sequence dimension or the hiding dimension can be expressed as:

$$X_k = \sum_{n=0}^{N-1} x_n e^{-\frac{2\pi i}{N}nk}, 0 \le k \le N-1 \tag{1}$$

where N is the length of the input sequence or the number of input tokens, and $X_k$ is the kth output of the output sequence $\{X_k\}$ with $k\in[0, N-1]$. The input sequence $\{x_n\}$ may be represented by input tokens or input embeddings in equation (1).

Alternatively, the DFT matrix can be applied to the input sequence. The DFT matrix W can be determined as:

$$W_{nk} = \left(e^{-\frac{2\pi i}{N}nk} / \sqrt{N}\right) \tag{2}$$

where $n, k=0, \ldots, N-1$, N is the length of the input sequence or the number of input tokens, $W_{nk}$ is the element at the nth row and kth column of the DFT matrix.

When DFT is the spectral transform, the spectral transform output, y, can be obtained as:

$$y=R(F_{seq}(F_h(x))) \tag{3}$$

where x is the input to the spectral transform mixing layer 130, $F_h$ is one dimensional DFT in the hidden dimension, $F_{seq}$ is one-dimensional DFT in the sequence dimension, and R represents extracting the real part of a number. The order of performing the one dimensional Fourier transforms along the two different dimensions in equation (3) can be reversed.

The Fourier transform, for example, along the sequence dimension, is configured to mix the input embeddings of the input tokens thereby providing the feed forward layer 150 sufficient access to multiple input tokens, e.g., all the input tokens, in each iteration in order to accurately and efficiently train the transformer system for convergence. In particular, the feed forward layer can generate its output as a function of multiple input tokens instead of one or just a limited number of isolated tokens. In some embodiments, a quantity of input tokens "visible" to the subsequent layer can be above a predetermined threshold. Without the mixing at the spectral transform mixing layer, the subsequent layer, e.g., a feed forward layer, can only use or "see" one or a limited number of isolated input tokens at each iteration for generating its output, and training of the transformer system can be less efficient and lack accuracy. In some embodiments, a quantity of input tokens "visible" to the subsequent layer can be 10 times, 20 times, or more than the number of isolated input tokens a layer of similar function can make available in traditional transformers and variants.

For Fourier transform along the hidden dimension, due to the duality of the Fourier transform, each alternating encoder block 110 can apply alternating Fourier and inverse Fourier transforms to its respective input, thereby transforming the input back and forth between the "time" and frequency domains. Because multiplication by the feed forward layer coefficients in the frequency domain is equivalent to convolving (with a related set of coefficients) in the time domain, the iterations of the encoder block 110 can alternate between multiplications and convolutions of the input embeddings of input tokens or corresponding inputs of encoder blocks 110.

Unlike the attention mechanism in traditional transformer architectures, the spectral transform need not include any parameter that needs to be trained. In the example of the Fourier transform, the Fourier transform may include a set of basis functions that are predetermined. For example, the set of basis functions can include sine and cosine waves with known amplitudes, phases, and frequencies. The set of basis functions are not adjusted during training of any part of the transformer system 100. The parameter(s) of the DFT, e.g., length of the DFT, are not trained or adjusted during training of any part of the transformer system.

The size of the Fourier transform can be determined based on the size of the input data, for example, based on the length of the input sequence length, the number of input tokens, the number of input embeddings, or a combination thereof. In some embodiments, the iteration number of the Fourier transform layer is an even number. When the iteration number is larger than a preset threshold, the iteration number can be even or odd.

One or more layers of the encoder block 110 are feed forward layers 150. Each feed forward layer 150 can follow a spectral transform mixing layer 130, either immediately after or with other layer(s) in between. The feed forward layer can take the real number as its input. The feed forward layer performs a non-linear transform on its input to generate its output. The feed forward layer herein can function similarly to that of traditional transformers and variants.

The encoder block 110 can include an additive layer 140, and the output of the additive layer 140 can be provided as an input for the feed forward layer 150. After the spectral transform output is generated at the spectral transform mixing layer 130, the spectral transform output can then be added at the additive layer 140 together with the input embeddings. A post-layer normalization layer 140 may also follow the spectral transform mixing layer 130, and can be positioned prior or subsequent to the additive layer 140 for normalization.

Similarly, another additive layer 160 can add input for the feed forward layer 150 and output from the feed forward layer 150 together to be an input for a subsequent encoder block 110.

The encoder architecture block 110 can be iterated multiple times until a desired output is generated or a predetermined threshold is met. The first iteration can use input embeddings derived from input tokens as its input. The subsequent iterations of the transformer encoder block 110 can use output from a previous encoder block as its input.

In some embodiments, the transformer system may include a processing block that is subsequent or prior to the encoder block 110. The processing block may be iterated. Each iteration of the processing block may include an attention layer as that being used in existing transformers or variants. The attention layer may be a self-attention layer. The attention layer may receive as input the output from its preceding encoder architecture block and generates as output, a mixing output of the output from its preceding encoder architecture block. The processing block may also include a feed forward layer that receives an input based on the output from its preceding encoder architecture block and the mixing output and generates an output for its subsequent processing block. The processing block may be similar to the encoder block 110 except that the spectral transform layer is replaced by a self-attention layer.

In some embodiments, the encoding block 110 containing the spectral transformer mixing layer 130 may be iterated for a times, and the processing block including the attention layer may be iterated for b times. The number a can be greater than b, e.g., 10 times, 20 times, 50 times or even more than b. Alternatively, the number a can be less than or equal to b. In some embodiments, some or all iterations of the encoding block 110 using spectral transform precedes all the iterations of the processing block including the attention layers. In other embodiments, the order of a iterations of the encoding block 110 and b iterations of the processing block can be of any predetermined order.

After all the iterations of the encoder block 110 and the processing blocks (if any), the transformer system 100 can include a dense layer 170 and an output projection layer 180 to generate the encoding output of the transformer system 110. The dense layer 170 and the output projection layer 180 may function similarly as those in existing transformers and variants.

The output of the transformer system 100, e.g., after the output projection layer 180, can include encoded representation of the input tokens. For example, the encoded representation can be vectors in a higher dimensional vector space than the input sequence. The encoded representation can be used to make predictions for various tasks related to natural language processing or computer vision. The output of the transformer system 110 may be provided as an input to a transformer decoder system, so that the decoder system can use the encoded representation of the input embeddings to generate an output sequence.

Figure 2:
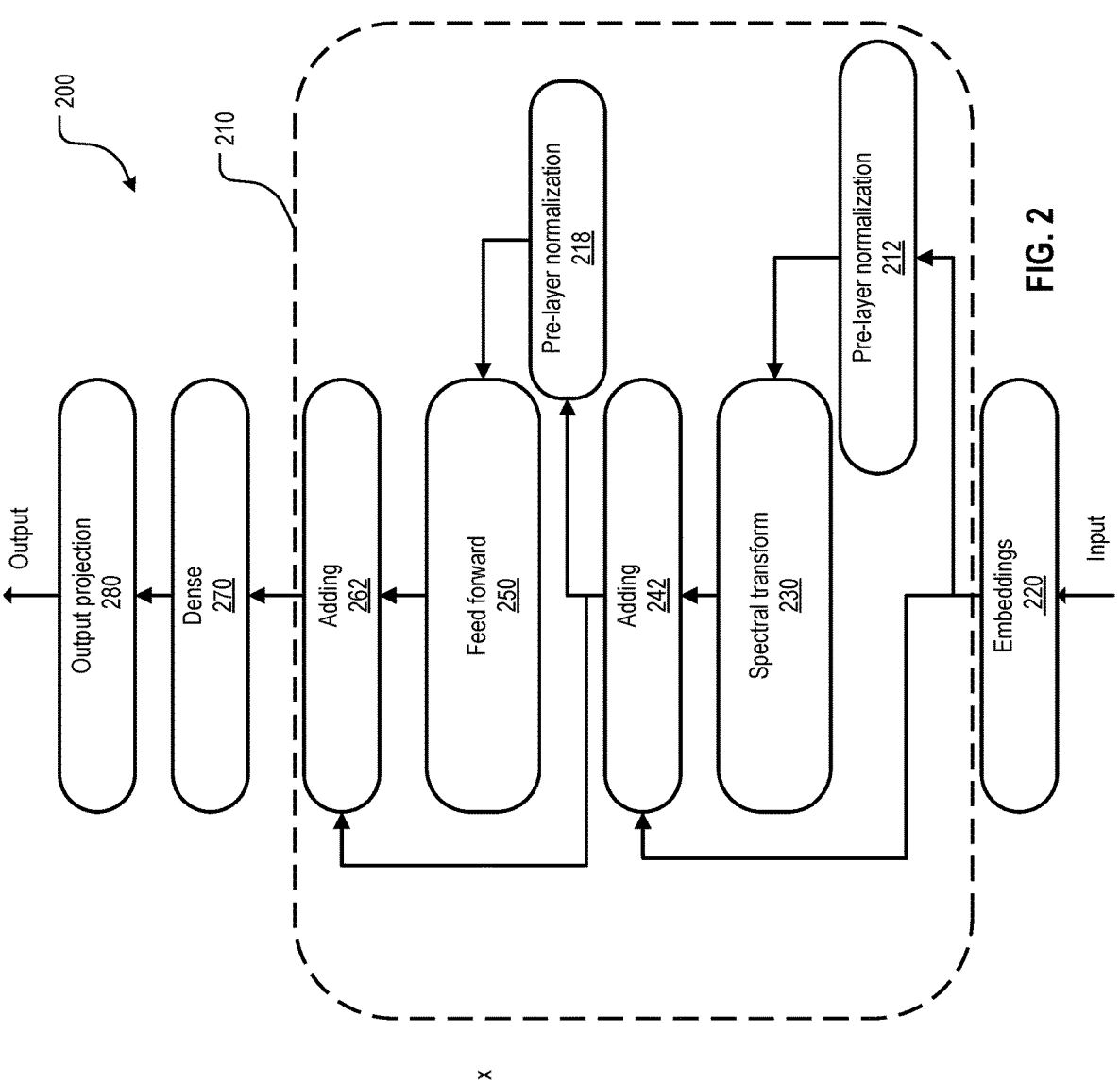
FIG. 2 is an illustration of another example transformer system.

FIG. 2 illustrates another implementation of the transformer system. In this particular implementation, the normalization is applied by implementing a pre-layer normalization layer 212, 218 prior to input into the spectral transform mixing layer 230 and also prior to input into the feed forward layer 250. In all other respects, the spectral transform mixing layer 220 of FIG. 2 performs as described as the spectral transform mixing layer 120 of FIG. 1, and the feed forward layer 230 of FIG. 2 performs as described as the feed forward layer 130 of FIG. 1. The embeddings layer 220, dense layer 270, and the output projection layer 280 each performs as described as the embeddings layer 120, dense layer 170, and the output projection layer 180 of FIG. 1, respectively.

As shown in FIGS. 1-2, each encoder block 110, 210 can include either the post-layer normalization layer 140 or pre-layer normalization layer 212 for the spectral transform mixing layer 130 230. Similarly, each encoder block 110, 210 can utilize either the post-layer normalization layer 140 or pre-layer normalization layer 102 for the feed forward layer 150, 250.

Figure 3:
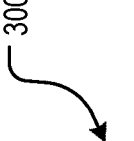
FIG. 3 is a flow diagram of an example process for using the example transformer system in FIGS. 1-2 to perform a deep learning task.
Figure 3:
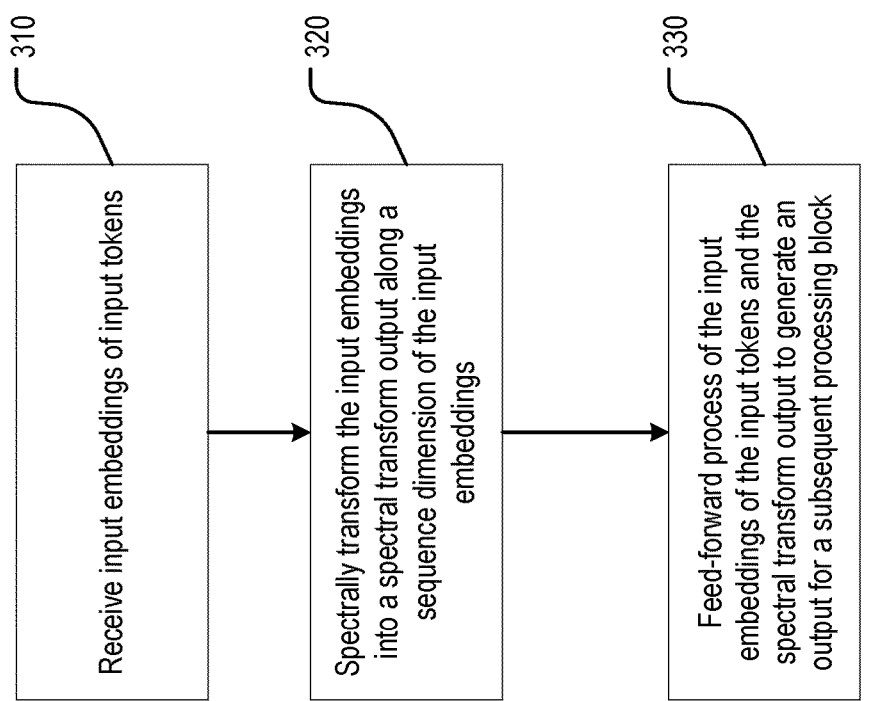

FIG. 3 is a flow diagram of an example process 300 for generating an encoded output. For convenience, the process 300 will be described as being performed by one or more computers located in one or more locations. For example, a deep learning system, e.g., transformer system 100 of FIG. 1, appropriately programmed in accordance with this specification, can perform the process 300.

The system receives, at a spectral transform mixing layer, input embeddings (310) that are derived from an input sequence or input tokens of the input sequence. As described above, the embeddings layer can derive the input embeddings and the input embeddings can include one or more different types of embeddings. The input embeddings can be received at the spectral transform mixing layers in a pre-set form, e.g., vectors or matrix.

The system spectrally transforms the input embeddings into a spectral transform output (320) at least along a sequence dimension of the input embeddings. The sequence dimension can be a dimension of vector space in which the input text is represented as the input sequence or input tokens. The spectral transform can take each input embedding or input token and represent it with respect to a set of basis functions. Specifically, the spectral transform can be a discrete Fourier transform, and the spectral transform output can include multiple representations, $X_k$, $0 \le k \le N-1$, wherein N is the sequence length. As described above in equation (1), each representation, $X_k$, can be a sum of all the input embeddings or input tokens $x_n$ weighted by corresponding basis functions. The spectral transform output advantageously provides mixed representations of multiple input tokens for its subsequent layer so that the subsequent can utilize the mixed representations of input tokens to generate its output. In other words, the spectral transform output can make some or all of the input tokens "visible" to a subsequent layer or a subsequent encoding block. Without the mixing by the spectral transform mixing layer, the subsequent layer can only use or "see" one or a limited number of isolated input tokens at each iteration. In some embodiments, the spectral transform output can allow the feed forward layer to utilize all the input tokens to generate its output.

The system can add the input embeddings of the input tokens and the spectral transform output into a combined input.

The system can normalize the combined input. Alternatively, the system can normalize the spectral transform output, the input embeddings of the input tokens, or both before they are combined together.

The system feed forward processes the combined input of the input embeddings of the input tokens and the spectral transform output to generate an output for a subsequent processing block (330).

The system can repeat the additive process and the normalization process on the output from the feed-forward processing of the combined input.

The process 300 can be iterated for multiple iterations until a predetermined threshold has been met or a predetermined number of iteration has been reached.

The process 300 can be iterated and combined with a second process in which the spectral transform is replaced by attention processing while the other operations within the process 300 remain the same. The second process can also be iterated, with a different number of iteration from the process 300. The combined process can be a hybrid process.

This specification uses the term "configured" in connection with computers and computer program components. For one or more computers to be configured to perform particular operations or actions means that the computer(s) has installed on it software, firmware, hardware, or a combination of them that in operation cause the computer(s) to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

The apparatus for implementing transformer systems and methods can also include, for example, special-purpose hardware accelerator units for processing common and compute-intensive parts of machine learning training or production, i.e., inference, workloads.

Transformer models or systems can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A transformer system, comprising:
one or more processors; and
a non-transitory computer readable memory in data communication with the one or more processors, the non-transitory computer readable memory storing an encoder architecture block executable by the one or more processors, the encoder architecture block comprising:
a spectral transform mixing layer that receives input embeddings of input tokens and generates, as output, a spectral transform output along a sequence dimension of the input embeddings, wherein the spectral transform mixing layer is defined by parameters representing a set of basis functions that are predefined and remain constant during training of the transformer system; and
a feed forward layer that receives an input based on the input embeddings of input tokens and the spectral transform output and generates an output for a subsequent processing block.

2. The transformer system of claim 1, wherein the spectral transform mixing layer generates the spectral transform output by applying the spectral transform to the input embeddings of the input tokens to mix the input embeddings, and wherein the spectral transform output allows the feed forward layer to generate the output for the subsequent processing block as a function of all of the input embeddings of the input tokens.

3. The transformer system of claim 2, wherein applying the spectral transform to the input embeddings to mix the input embeddings of the input tokens comprises representing the input embeddings of the input tokens with respect to the set of basis functions.

4. The transformer system of claim 1, wherein the spectral transform mixing layer performs a discrete Fourier transform on the input embeddings.

5. The transformer system of claim 4, wherein the discrete Fourier transform is along the sequence dimension and a hidden dimension.

6. The transformer system of claim 4, wherein the feed forward layer processes only a real portion of the spectral transform output.

7. The transformer system of claim 1, the encoder architecture block further comprising:

a pre-layer normalization layer that normalizes the input embeddings of the input tokens prior to the input embeddings being provided as input to the spectral transform mixing layer; and an additive layer that receives as input the input embeddings of the input tokens and the spectral transform output and generates and performs an additive function on the input embeddings of the input tokens and the spectral transform output to generate an input for the feed forward layer.

8. The transformer system of claim 1, the encoder architecture block further comprising:

an additive and normalization layer that receives as input the input embeddings of the input tokens and the spectral transform output and generates and performs and additive function and a normalization function on the input embeddings of the input tokens and the spectral transform output to generate an input for the feed forward layer.

9. The transformer system of claim 1, wherein the input embeddings comprises word embeddings of the input tokens, position embeddings of the input tokens, type embodiments of one or more input sentences, or a combination thereof.

10. The transformer system of claim 1, wherein the subsequent processing block comprises an iteration of the encoder architecture block, and wherein the transformer system further comprises an even number of iterations of the encoder architecture block following the subsequent processing block.

11. The transformer system of claim 1, wherein the subsequent processing block comprises:

a self-attention layer that receives as input the output from the encoder architecture block and generates as output, a mixing output of the output from the encoder architecture block; and a second feed forward layer that receives a second input based on the output from the encoder architecture block and the mixing output and generates an output for a second subsequent processing block.

12. The transformer system of claim 11 further comprises a first number of iterations of the encoder architecture block, and a second number of iterations of the subsequent processing block.

13. The transformer system of claim 1, wherein the spectral transform mixing layer generates the spectral transform output by applying the spectral transform to the input embeddings to generate a representation of the input embeddings in an alternative domain.

14. The transformer system of claim 13, wherein generating the representation of the input embeddings in the alternative domain comprises representing the input embeddings with respect to a set of alternative basis functions of the alternative domain.

15. A method performed by a transformer system, comprising:

receiving, by a spectral transform mixing layer, input embeddings of input tokens, wherein the spectral transform mixing layer is defined by parameters representing a set of basis functions that are predefined and remain constant during training of the spectral transform mixing layer;

spectrally transforming, by the spectral transform mixing layer, the input embeddings into a spectral transform output along a sequence dimension of the input embeddings; and feed-forward processing, by a feed forward layer, the input embeddings of the input tokens and the spectral transform output to generate an output for a subsequent processing block.

16. The method of claim 15, wherein spectrally transforming the input embeddings into the spectral transform output comprises performing a discrete Fourier transform on the input embeddings.

17. The method of claim 16, wherein the discrete Fourier transform is performed along the sequence dimension and a hidden dimension.

18. The method of claim 17, wherein the feed forward processing of the input embeddings of the input tokens and the spectral transform output comprises processing only a real portion of the spectral transform output.

19. A non-transitory computer readable medium storing instructions executable by one or more processing devices and that upon such execution cause the one or more processing devices to perform operations comprising:

receiving, by a spectral transform mixing layer, input embeddings of input tokens, wherein the spectral transform mixing layer is defined by parameters representing a set of basis functions that are predefined and remain constant during training of the spectral transform mixing layer;

spectrally transforming, by the spectral transform mixing layer, the input embeddings into a spectral transform output along a sequence dimension of the input embeddings; and feed-forward processing, by a feed forward layer, the input embeddings of the input tokens and the spectral transform output to generate an output for a subsequent processing block.

* * * * *